UNITED STATES PATENT OFFICE

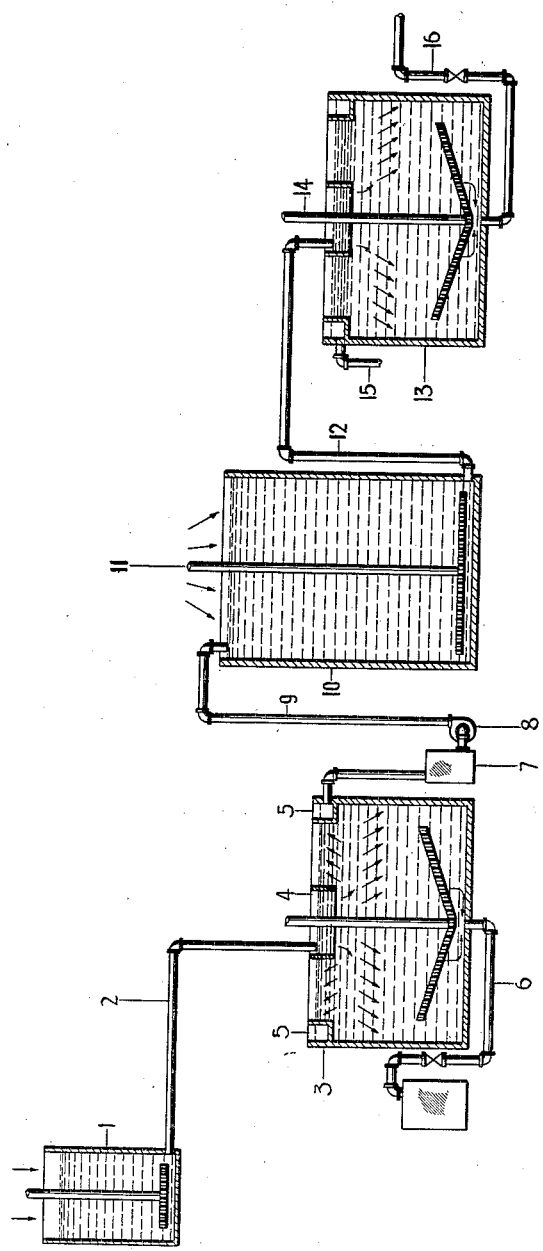

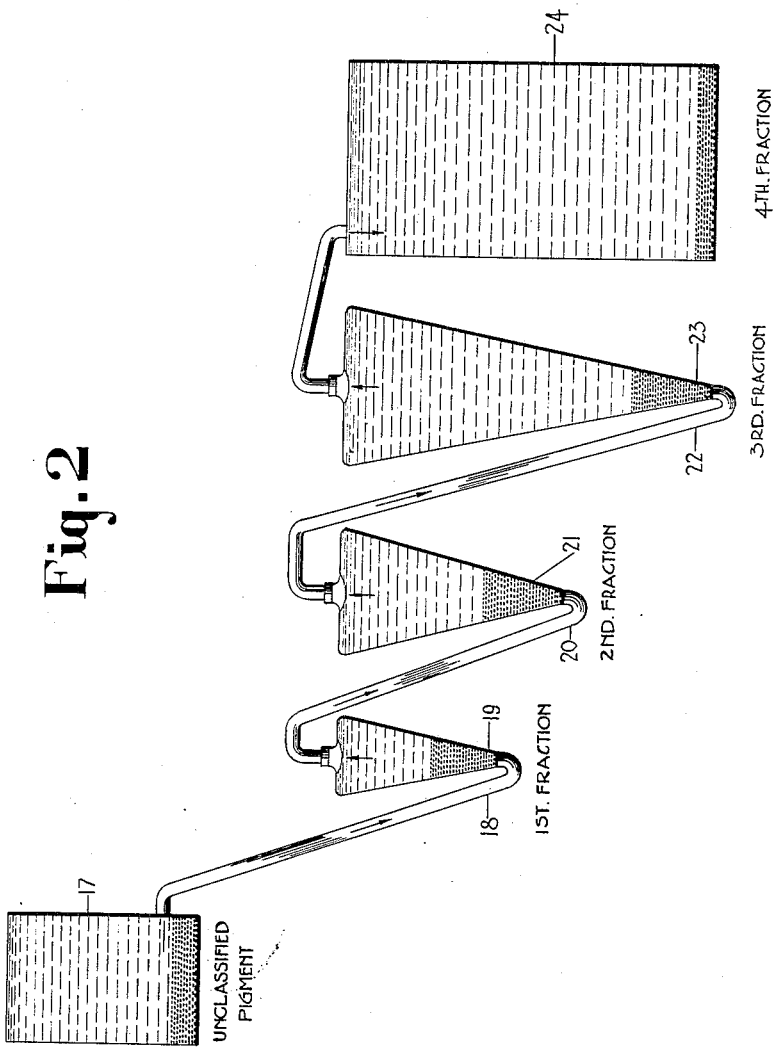

MARION L. HANAHAN, OF NEWARK, NEW JERSEY, ASSIGNOR, BY MESNE ASSIGNMENTS, TO KREBS PIGMENT & COLOR CORPORATION, OF WILMINGTON, DELAWARE, A CORPORATION OF DELAWARE

LITHOPONE PIGMENT SUITABLE FOR FLAT WALL PAINTS AND ENAMELS

Application filed March 7, 1927. Serial No. 173,531.

This invention relates to a new type of lithopone suitable for flat wall paints and enamels and more particularly to a pigment having a certain particle size containing no very fine particles.

This application is a continuation in part of my copending application Serial No. 163,213, filed January 24, 1927, in which application is described and claimed a pigment of very fine smooth texture suitable for gloss paints and enamels.

Heretofore, the customary procedure in making lithopone has been to mix together solutions of barium sulphide and zinc sulphate respectively, filter, dry, and calcine the resulting precipitate. The calcined pigment is quenched and the resulting water slurry is ground on burrstone mills or pebble mills or any of the standard types of wet grinding equipment. The slurry is then washed by settling and decantation, filtered, dried, and dry ground. The degree of wet grinding of the quenched lithopone is usually such that over 99% should pass thru a 200 mesh screen. In the case of the more recent lithopone production the fraction frequently runs over 99.7% thru 325 mesh. The properties of pigments, such as lithopone, in a paint or enamel film are affected by particles small enough to pass thru even a 325 mesh screen. The difficulty in using ordinary lithopones for gloss paints and enamels has been pointed out in my said copending application and a solution of the difficulty has been found and claimed therein which consists in preparing a lithopone having a very fine, smooth texture similar to that of fumed zinc oxide by forming a suitable slurry and elutriating to eliminate coarser particles that cause irregularities visible in a gloss paint or enamel film. In the present application, however, it is desired to prepare a pigment such as lithopone for use in flat wall paints and enamels, and for such purpose the particle size should not be as fine as described in the said copending application, but should consist of particles of larger size, preferably approximating a uniform size, as such a pigment lends itself better for use in flat wall paints, enamels, etc.

This invention, accordingly, comprises the preparation of a pigment suitable for flat wall paints and enamels, and comprises also a process of preparing such a pigment preferably by a process of elutriation of an aqueous or other suspension of the ground pigment, preferably containing a suitable dispersing agent to eliminate flocculation of the particles during the elutriation. The elutriation is designed to separate the pigment into two or more (as many as desired) fractions of varying particle size, which fractions exhibit different properties and are adapted for particular uses. The finer fractions comprising, for example, particles less than 1 micron in diameter are especially suited for enamels and gloss paints, as previously recited, and the coarser fractions are particularly well suited for making flat paints and enamels. Each fraction is much better adapted to the purpose mentioned than is the original pigment.

The suspension of the pigment, as for example lithopone, in water is obtained by grinding lithopone in a suitable equipment and treating it with a dispersing agent, such as sodium silicate. The function of the dispersing agent is to deflocculate and disperse the lithopone particles so that they may be separated by settling out according to their particle size. The alkalinity of the aqueous suspension is advantageously not less than the equivalent of a pH of 5.5. In some cases the alkalinity of sodium silicate is itself sufficient, but where it is not the pH is preferably brought to the desired value by the addition of sodium hydroxide or other alkali. The preferred pH is 9.0.

The slurry should not be too concentrated, as high concentration of solids interferes with the separation of the coarse and fine particles. The preferred concentration for the feed slurry is 15 parts of water to 1 of lithopone, altho this may be varied from 8 to 1 up to any desired higher value. The concentration is important, however, only in the actual separation zone where the fines are traveling upwardly and the coarse material downwardly. At this point the preferred maximum concentration should be 20 to 1, but a range down to 12 to 1 may be used.

The slurry after treatment is fed into a suitable type of elutriating vessel, such as is used in the mining and metallurgical industries, for the separation of minerals of different particle size or specific gravity. The Callow cone and the Dorr Co. hydroseparators are examples of this type of equipment. The process may, however, be conducted in an ordinary tank or vessel wherein the inlet and outlet openings are suitably arranged.

The suspension of lithopone enters the separating vessel and flows upwardly thru it to the outlet, the flow being regulated to a rate at which the desired pigment particles deposit against the flow of liquid and the finer particles are discharged in the overflow so that they are separated from the final product desired. The deposited particles may be collected all at one point or they may be collected at several points, according to the different grades of coarser particles desired.

In a well dispersed suspension, such as is obtained with a 0.5% sodium silicate, the size of particle going out in the overflow and the size of particle deposited is proportional to the vertical velocity of the suspension; or for a vessel of given dimensions it is proportional to the volume of suspension flowing upwardly in a given time. As stated in my said co-pending application, I have found that for fine enamels a pigment of suitable particle size is obtained in an aqueous suspension which has been passed upwardly thru an elutriator at a rate of three feet per hour or less, and the slower the rate the finer is the resulting overflow suspension, as a general proposition. The rate of flow may be 6 feet per hour or less, and there is thereby obtained not only the aforesaid fine pigment but also the coarser particles deposited out against the flow, and the latter constitute a product of my invention suitable for flat wall paints and enamels of the interior wall finish types. In cases where the coarse fraction is to be utilized as a flat pigment the flow may not be advantageously decreased below six inches per hour; the preferred rate is two feet per hour. It should be stated that the rates of flow apply when the temperature is 20° C. If the temperature is increased the rates of flow may be increased, because of the increased rate of settling.

For example, I have prepared a slurry of 7 parts lithopone; 93 parts water; 0.035 part sodium silicate approximating 40° Bé; in a mixing tank. The slurry is fed at a constant rate of flow (e. g., 100 gal. per min.) to a 15 ft. diameter Dorr hydroseparator. From the bottom of the hydro-separator the coarse fraction of lithopone is removed at the rate of 10 gal. per minute of slurry, consisting of 2 parts water to 1 part lithopone.

The product of this invention when ground in oils to make paints and enamels has been found, as aforesaid, to be suitable for flat wall paints and enamels distinctly superior to such compositions prepared with the untreated pigment. The product may otherwise be defined as a lithopone having a certain minimum particle size equal to that which settles out from a well dispersed aqueous suspension of original pigment passed upwardly thru an elutriator at a rate of flow above 6 inches per hour at a temperature above 15° C.

Various devices may be adopted for carrying out the process of obtaining this product. By way of example, two forms of apparatus are shown.

Figure 1 represents the side elevation of a plant equipment and

Figure 2 represents the side elevation of a simple apparatus showing how various grades of product may be obtained.

In said Figure 1 there is shown a mixing tank (1) for lithopone and water provided with a conduit (2) to conduct the mixture to a hydro-separator (3), which is provided with an agitating device (4), an overflow trough (5) and a conduit (6) for conveying away the coarse fraction separated out. The overflow empties into a tank (7) where a centrifugal pump (8) forces the liquid thru conduit (9) into a tank (10). Tank (10) contains agitating device (11) and is designed to receive a sulphuric acid spray to mix with the liquid therein. A conduit (12) leads to a tank (13), called a thickener, which is provided with an agitating device (14), an overflow trough (15) and a bottom delivery pipe or conduit (16) that conveys away the thick slurry fines. The trough (15) is for the clear aqueous or other clear liquid overflow.

The operation of this device will probably be evident from the previous description. It consists in introducing lithopone and water plus a dispersing agent, such as sodium silicate solution, into the tank (1) and mixing it therein. The mixture is conducted into tank (3) where the upward flow at a definite and constant rate permits separation of the particles according to their respective sizes. The introduction of liquid thru conduit (2), of course, causes an overflow into trough (5) and the rate of introduction of liquid will determine the rate at which the column of liquid in tank (3) moves upwardly as a whole, that is, the number of feet per hour movement of the body or column. The overflow, therefore, containing the fine particles passes on thru conduit (9) into tank (10) where the alkalinity is reduced for the purpose of coagulating the particles, as heretofore described. The coagulated pigment is passed into the tank (13), preferably agitated therein, and collected at the bottom of the tank thru conduit (16), whereas the clear water or other liquid used goes into the overflow (15). It will be seen that the operation of tank (13) is different from tank (3), as in the latter the overflow contains the fine pigment, whereas in tank (13), the overflow is clear liquid. The coarse fraction obtained thru conduit (6) at the beginning of the operation may be used for flat wall paints directly or may be retreated.

In Figure 2 a mixing tank (17) is shown provided with a conduit (18) leading to a separator or elutriator (19) where a very coarse fraction may be first separated out. The conduit (20) leads to a separator or elutriator (21) where a second fraction may be separated out and a conduit leads thence to a third elutriator where a third fraction may be separated out. From (23) the liquid goes to a vessel (24) where a further deposit of pigment is obtained. This apparatus, while designed on the laboratory scale, may be built in larger units or otherwise modified for plant practice, in order to secure various fractions. In the present case, for example, the unclassified pigment in (17) would be agitated to form a suspension again and fed to the separating vessels when the operation is resumed; and the fraction in (19) would be very coarse and probably objectionable in both flat and gloss paints. The second fraction in (21) would be permissible in flat paints but objectionable in gloss paints. The third fraction in (23) would be moderately fine in particle size and suitable in flat paints, while the fourth fraction in (24) would be suitable in gloss paints and objectionable in flat paints. As previously shown in the foregoing description, the rate of flow of the liquid suspending medium will determine the character of the deposit where the apparatus is of a given predetermined character. The slurry becomes thicker as the operation progresses. The accumulation of particles in this laboratory type of apparatus requires the stopping of the operation for emptying of the vessels when the concentration gets too high. As stated, various forms of apparatus may be used. A series of separating vessels, each successive one yielding a finer product than the preceding unit, may be used to obtain as many different grades as desired, but for present practical purposes two grades are probably sufficient, one for enamel paints and one for flat paints.

The rate of upward flow necessary to eliminate particles above a given size will vary with the temperature. Under the conditions previously described the rate of settling practically doubles for a 30° C. rise in temperature. A temperature of about 15° C. or higher may be taken as the temperature for the rates of flow discussed, having due regard for increasing the rate with temperature increase.

The preferred liquid suspending agent is water, altho other liquids may be used where suitable. When using water, a dispersing agent such as sodium silicate should be used and the alkalinity should be controlled within certain ranges as aforesaid, in order to facilitate the suspension of the pigment. Any method of obtaining satisfactory dispersion so that size classification is possible may be used. A specially treated water or liquid containing dispersive media may be used for suspending the pigment. When using water in conjunction with a dispersing agent, the rate of flow is as aforesaid, preferably below 6 feet an hour; that is to say, a column of water containing the suspension should move upwardly at that rate in order to separate the lithopone into fine texture particles on one hand and into a coarse grade suitable for flat paints on the other hand. Where other liquid media are used, the rate would be adjusted according to the viscosity of the liquid, the concentration of the pigment therein, and the character of the dispersing agent, if any be used. The use of water, therefore, is illustrative merely of the way in which the new valuable lithopone product may be obtained.

As many apparently widely different embodiments of this invention may be made without departing from the spirit thereof, it is to be understood that I do not limit myself to the foregoing examples or description except as generally indicated in the claim.

I claim:

A calcined lithopone pigment which when mixed with oil to produce a flat wall paint produces a paint which when dry shows substantially complete diffused reflection of light, said lithopone pigment being substantially identical with the fraction of pigment which settles out against the flow in elutriating a deflocculated aqueous slurry of calcined lithopone at a rate of more than 6 inches and less than 6 feet per hour.

In testimony whereof I affix my signature.

MARION L. HANAHAN.